US012519231B2

(12) United States Patent
Ayala Vazquez et al.

(10) Patent No.: US 12,519,231 B2
(45) Date of Patent: Jan. 6, 2026

(54) ELECTRONIC DEVICE HAVING ANTENNA TUNERS AROUND CONNECTOR

(71) Applicant: Apple Inc., Cupertino, CA (US)

(72) Inventors: Enrique Ayala Vazquez, Watsonville, CA (US); Ming-Ju Tsai, Sunnyvale, CA (US); Yiren Wang, Cupertino, CA (US); Yuan Tao, Santa Clara, CA (US); Hao Xu, Cupertino, CA (US); Sidharath Jain, Redwood City, CA (US); Haozhan Tian, San Jose, CA (US); Yuancheng Xu, San Jose, CA (US); Eric W Bates, San Jose, CA (US); Peter A Dvorak, Menlo Park, CA (US); Harlan S Dannenberg, San Francisco, CA (US); Rees S Parker, San Francisco, CA (US); Obinna O Onyemepu, Campbell, CA (US); Victor C Lee, Santa Clara, CA (US); Han Wang, Campbell, CA (US); Hongfei Hu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 18/458,720

(22) Filed: Aug. 30, 2023

(65) Prior Publication Data

US 2024/0079778 A1 Mar. 7, 2024

Related U.S. Application Data

(60) Provisional application No. 63/404,095, filed on Sep. 6, 2022.

(51) Int. Cl.
*H01Q 5/328* (2015.01)
*H01Q 9/04* (2006.01)

(52) U.S. Cl.
CPC ........... *H01Q 5/328* (2015.01); *H01Q 9/0442* (2013.01); *H01Q 9/045* (2013.01)

(58) Field of Classification Search
CPC ....... H01Q 5/328; H01Q 9/0442; H01Q 9/045
See application file for complete search history.

(56) References Cited

U.S. PATENT DOCUMENTS 9,166,279 B2 * 10/2015 Jin ......................... H01Q 5/307
9,293,807 B2 3/2016 Wong et al.
(Continued)

FOREIGN PATENT DOCUMENTS

KR 20210048342 5/2021

*Primary Examiner* — Henry Luong
(74) *Attorney, Agent, or Firm* — Treyz Law Group, P.C.; Michael H. Lyons

(57) ABSTRACT

An electronic device may be provided with an antenna having a resonating element formed from a segment of peripheral conductive housing structures. A speaker may be aligned with first openings in the segment. A vent may be aligned with second openings in the segment. A connector may protrude through the segment. A trace combiner for the antenna may be patterned onto the speaker and may be coupled to the segment. Tuners for the antenna may be disposed on first and second flexible printed circuits that extend along opposing sides of the connector. The tuners may be controlled through the speaker. The second flexible printed circuit may extend along the vent. The vent may have a vent cowling with a cut-out region next to the tuner on the second flexible printed circuit.

20 Claims, 10 Drawing Sheets

(56) References Cited

U.S. PATENT DOCUMENTS

| | | | |
|---|---|---|---|
| 9,425,496 | B2 | 8/2016 | Zhu et al. |
| 9,876,273 | B2 | 1/2018 | Lui et al. |
| 10,128,572 | B2 | 11/2018 | Caratelli et al. |
| 10,193,597 | B1 | 1/2019 | Garrido Lopez et al. |
| 11,205,834 | B2 | 12/2021 | Ayala Vazquez et al. |
| 11,211,698 | B2 | 12/2021 | Shi et al. |
| 11,394,408 | B2 | 7/2022 | De Jongh et al. |
| 2020/0076056 | A1 | 3/2020 | Froese et al. |

* cited by examiner

ELECTRONIC DEVICE HAVING ANTENNA TUNERS AROUND CONNECTOR

This application claims the benefit of U.S. Provisional Patent Application No. 63/404,095, filed Sep. 6, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for electronic devices to also include other components such as speakers, connectors, and microphones.

It can be challenging to provide small form factor electronic devices with antennas that still exhibit satisfactory wireless performance despite the presence of nearby components.

SUMMARY

An electronic device may be provided with wireless circuitry and a housing having peripheral conductive housing structures. A display may be mounted to the peripheral conductive housing structures. A rear housing wall may be mounted to the peripheral conductive housing structures opposite the display. The rear housing wall may have a dielectric cover layer and a conductive support plate on the dielectric cover layer.

The segment of the peripheral conductive housing structures may form an antenna resonating element arm for an antenna. The antenna may have an antenna ground formed from ground structures separated from the segment by a slot. The ground structures may include the conductive support plate, a conductive portion of the display, and a mid-chassis for the device. A speaker may overlap the slot and may be aligned with first openings in the segment. Vent structures may overlap the slot and may be aligned with second openings in the segment. A connector may overlap the slot and may protrude through an opening in the segment that is interposed between the first openings and the second openings. The connector may be mounted to a dock flex.

The speaker may include a substrate having a first lateral surface mounted to the dock flex and having an opposing second lateral surface. Conductive springs on the first lateral surface may couple conductive structures on the speaker to ground traces on the dock flex, a signal conductor on the dock flex from a radio-frequency transmission line for the antenna, and control traces on the dock flex. The ground traces on the dock flex may be shorted to the conductive structures in the display. The speaker may include a speaker plate. Conductive springs on the second lateral surface may couple the speaker plate to the conductive support plate.

The signal conductor may be coupled to a positive antenna feed terminal for the antenna. The positive antenna feed terminal may be coupled to a first location on the segment by a switch. The positive antenna feed terminal may be coupled to a second location on the segment by a trace combiner. The trace combiner may be formed from a conductive trace on the second lateral surface of the substrate. The antenna may include a first tuner coupled between the ground structures and the second location on the segment. The antenna may also include a second tuner coupled between the ground structures and a third location on the segment. The connector may be interposed between the second and third locations. One of the conductive springs on the first lateral surface of the substrate may receive control signals for the first and second tuners from the control traces on the dock flex.

The device may include a first flexible printed circuit and a second flexible printed circuit mounted to the first flexible printed circuit. The first flexible printed circuit may extend along the second lateral surface of the substrate and may be folded onto a sidewall of the substrate. The first flexible printed circuit may be coupled to the second location on the segment. The first flexible printed circuit may include a ground trace extending from a conductive interconnect structure on the speaker to the second location on the segment. The first tuner may be disposed on the ground trace.

The first flexible printed circuit may extend along a first side of the connector. The second flexible printed circuit may be folded onto a sidewall of the substrate and may extend along a second side of the connector opposite the first side of the connector. The second flexible printed circuit may be coupled to the third location on the segment. The second flexible printed circuit may include a ground trace extending from the conductive interconnect structure to the third location on the segment. The second tuner may be disposed on the ground traces. Control traces may extend from the conductive interconnect structure to the first tuner through the first flexible printed circuit and to the second tuner through the second flexible printed circuit. The conductive interconnect structure may couple the control signals onto the control traces on the first and second flexible printed circuits. The control traces on the first and second flexible printed circuits may convey the control signals to the first and second tuners to adjust a frequency response of the antenna.

The vent structures may include a dielectric substrate having one or more cavities and one or more openings aligned with the second openings in the segment. The cavities and the openings may be used to pass acoustic sound from outside the device to a microphone inside the device and/or to serve as a barometric vent for the device. The vent structures may include a metal vent cowling layered over a lateral surface of the dielectric substrate. First and second conductive springs may couple the vent cowling to the conductive support plate. The second printed circuit may run along a sidewall of the dielectric substrate. The vent cowling may include a cut-out region at, adjacent to, and/or around the second tuner on the second flexible printed circuit. This may keep the vent cowling from forming a capacitive shunt to ground for antenna currents on the second flexible printed circuit.

DETAILED DESCRIPTION

Figure 1:
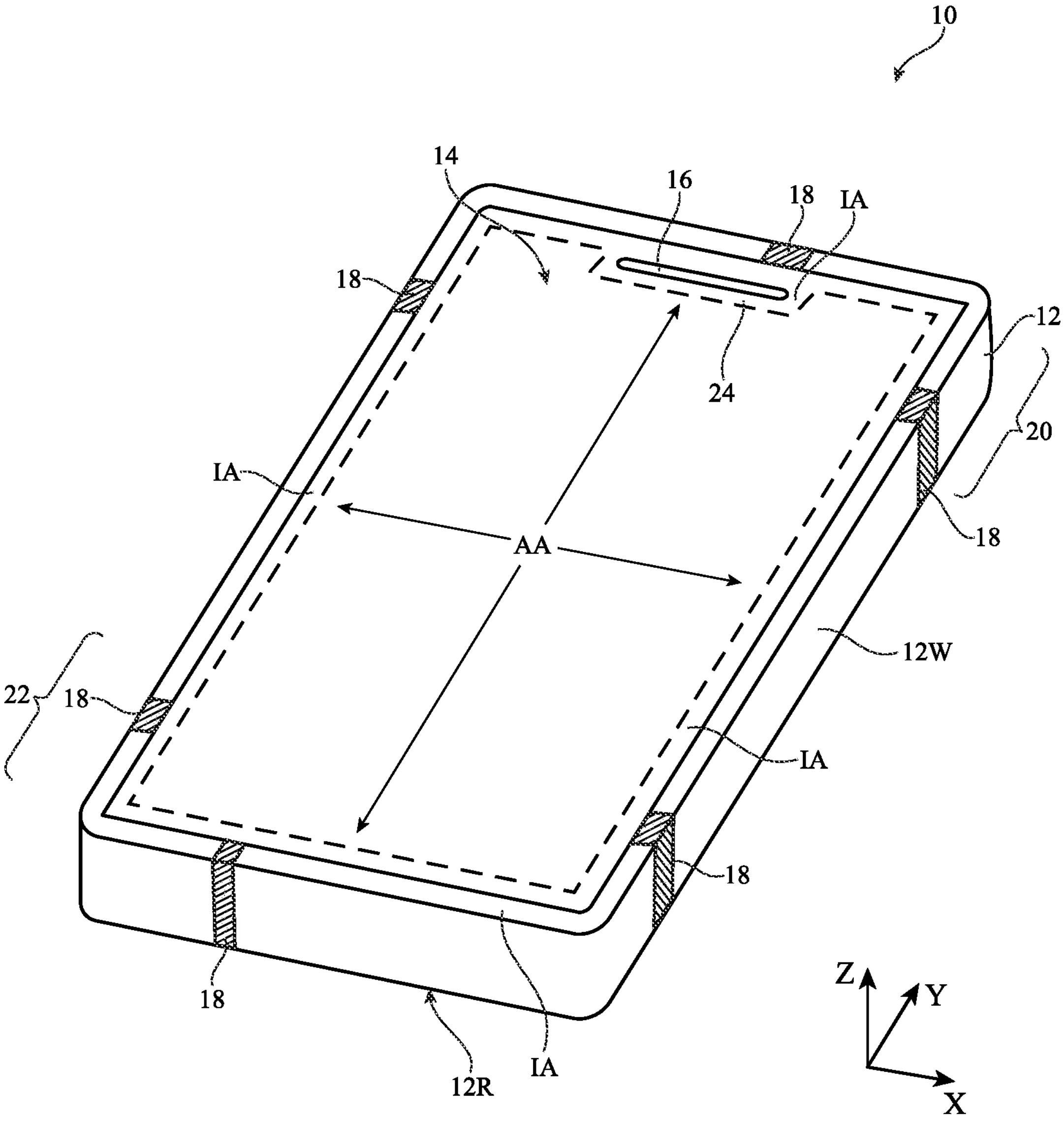
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
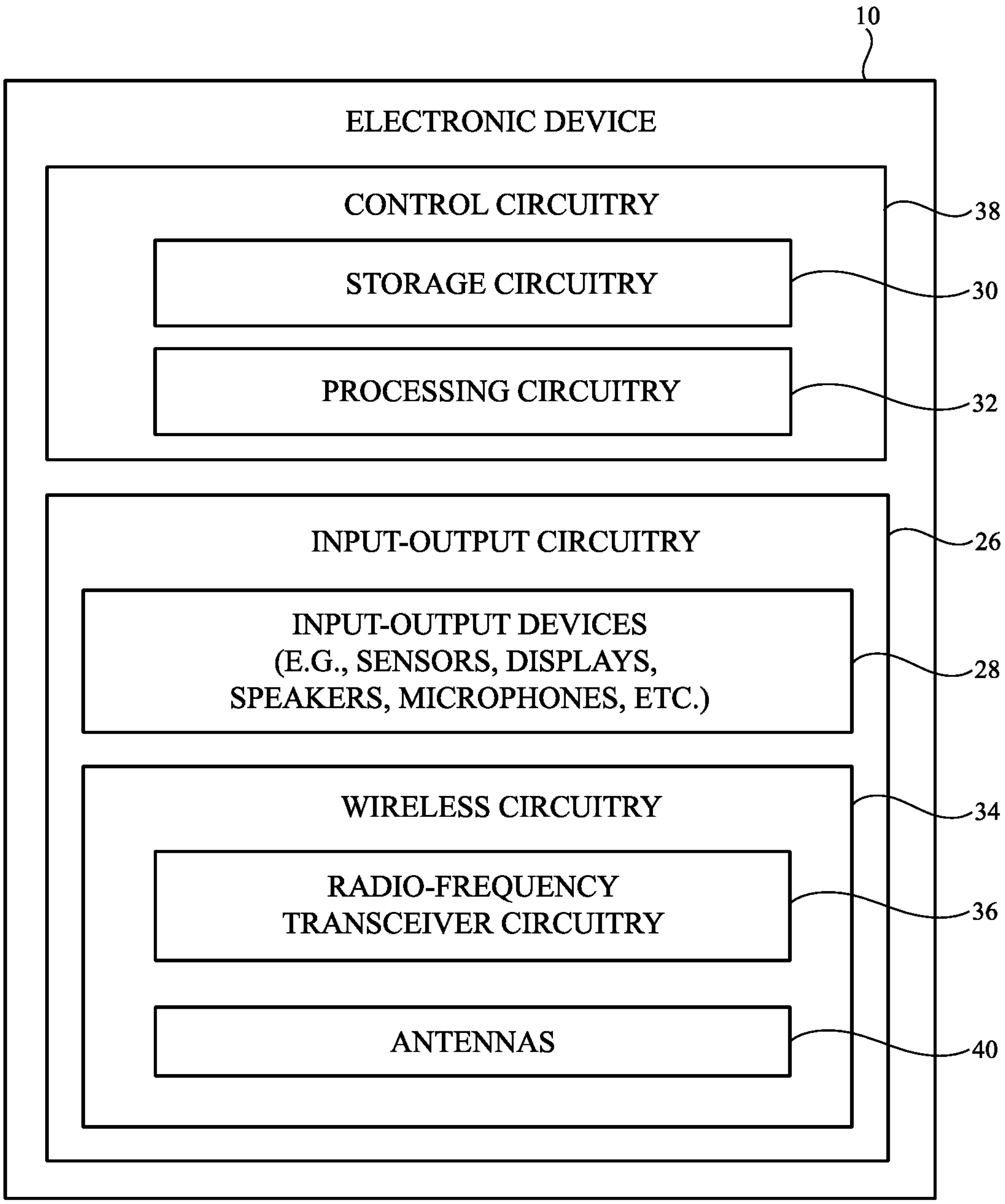
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
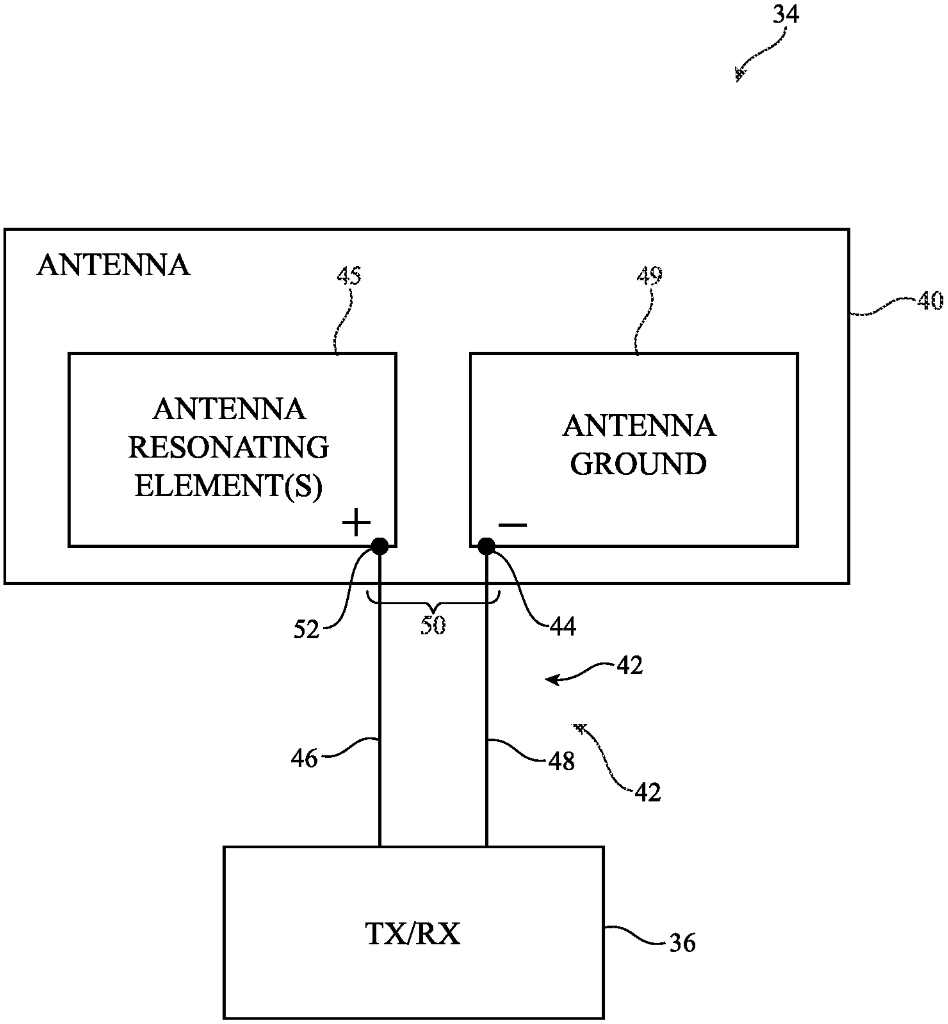
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
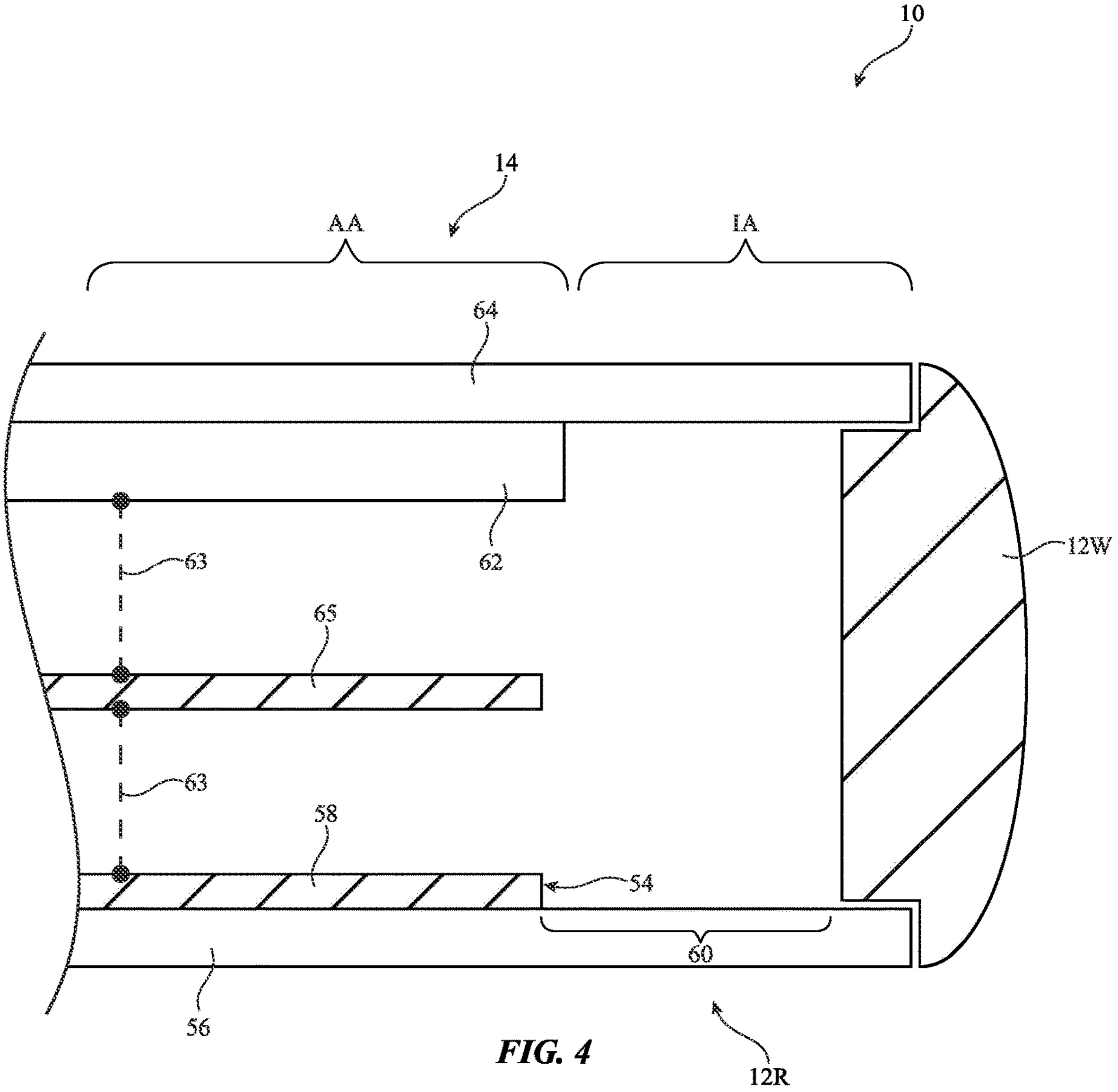
FIG. 4 is a cross-sectional side view of an illustrative electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
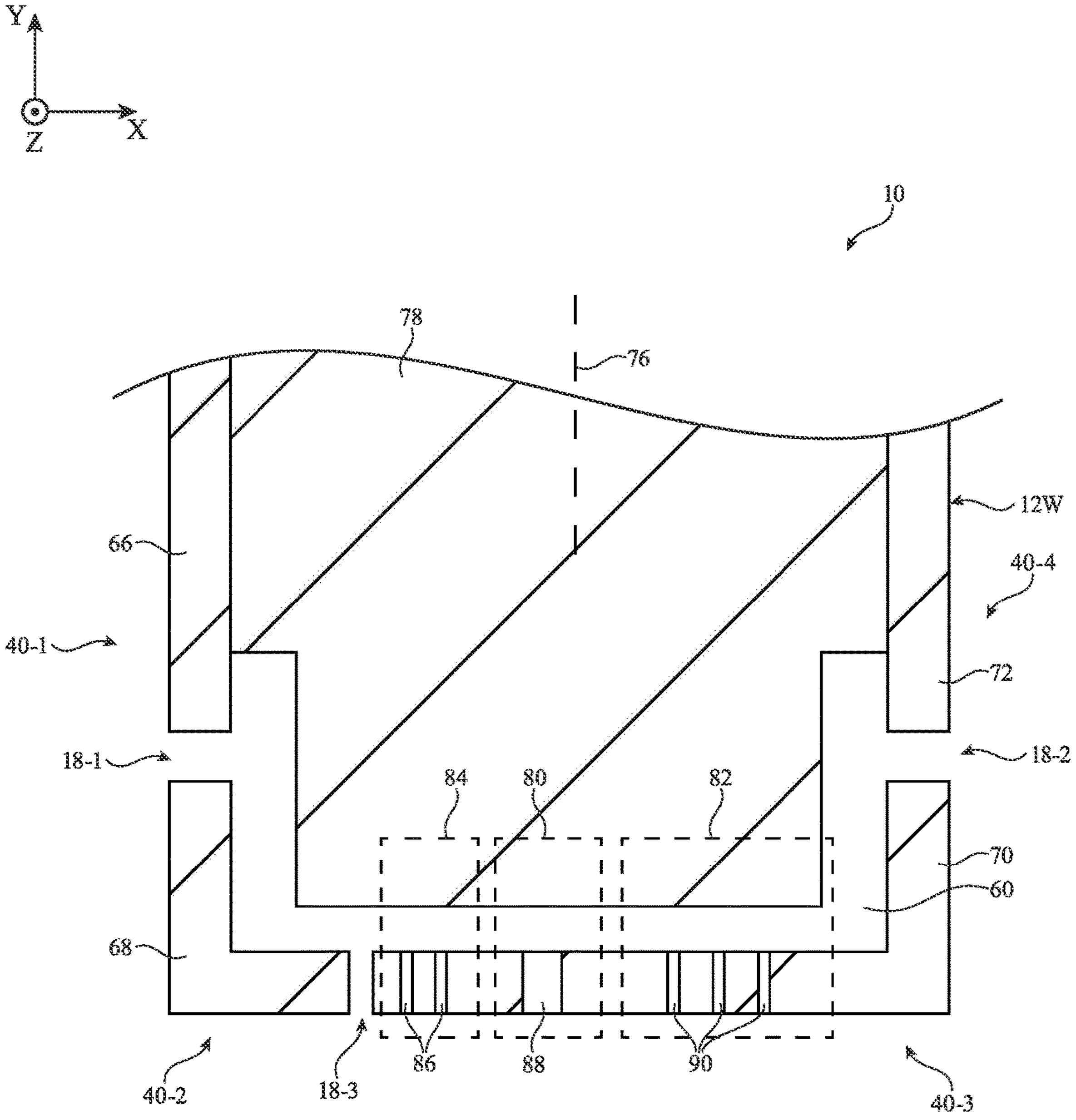
FIG. 5 is an interior top view of the lower end of an illustrative electronic device having antennas, speaker structures, connector structures, and vent structures in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as conductive support plate 58 (FIG. 4), mid-chassis 65 (FIG. 4), conductive display structures, conductive interconnect structures 63 (FIG. 4), conductive traces on a printed circuit board, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 66 and/or a portion of slot 60 (e.g., a vertically extending end of slot 60 that extends parallel to longitudinal axis 76 and past gap 18-1, between segment 66 and ground structures 78) and having an antenna ground formed from ground structures 78. Device 10 may also include a second antenna 40-2 having an antenna resonating element (e.g., a resonating element arm) formed from segment 68 and having an antenna ground formed from ground structures 78. Device 10 may also include a third antenna 40-3 having an antenna resonating element (e.g., a resonating element arm) formed from segment 70 and having an antenna ground formed from ground structures 78. Device 10 may also include a fourth antenna 40-4 having a slot antenna resonating element formed from segment 72 and/or a portion of slot 60 between segment 72 and ground structures 78. Antennas 40-2 and 40-3 may be, for example, inverted-F antennas having return paths that couples the respective resonating element arms to the antenna ground. Antennas 40-1, 40-2, 40-3, and 40-4 may convey radio-frequency signals in one or more frequency bands (e.g., using MIMO communications in one or more of bands, thereby maximizing data throughput).

Device 10 may include one or more components that overlap the volume of one or more antennas 40 in lower region 22 of device 10. For example, device 10 may include speaker structures 82, connector structures 80, and vent structures 84 overlapping the volume of antenna 40-3. Speaker structures 82, vent structures 84, and connector structures 80 may at least partially overlap and may bridge slot 60 from ground structures 78 to segment 70 of peripheral conductive housing structures 12W.

Speaker structures 82 may include a speaker aligned with one or more openings (holes) 90 in segment 70 of peripheral conductive housing structures 12W. Openings 90 may form a speaker port for the speaker. The speaker may produce acoustic sound (e.g., sound waves) that is acoustically amplified within an acoustic cavity or chamber of the speaker and that escapes from the speaker through openings 90, thereby allowing a user to hear the sound. Speaker structures 82 may sometimes be referred to herein as speaker module 82, acoustic (speaker) receiver 82, or simply as speaker 82.

Connector structures 80 may include a connector that protrudes through an opening (hole) 88 in segment 70 of peripheral conductive housing structures 12W (sometimes referred to herein as a dock connector or docking port). Connector structures 80 may also include a printed circuit (e.g., a flexible printed circuit sometimes referred to herein as a dock flex). The connector may be mounted to the dock flex. The dock flex may include conductive paths that are coupled to the connector. The connector may receive a mating external connector (e.g., from a cable, cord, peripheral device, charger, etc.). The connector may receive power, control signals, and/or data signals from the external connector and may pass the power, control signals, and/or data signals to the conductive paths. The connector may be compatible with a standardized protocol such as a universal serial bus (USB) protocol if desired (e.g., the connector may be a USB connector). The power may be used to power components in device 10 and/or to charge a battery in device 10. The connector may also be used to transmit power, control signals, and/or data signals from device 10 to the external connector. If desired, the dock flex may include conductive paths that are used to form one or more radio-frequency transmission lines for antenna 40-3. Connector structures 80 may also include one or more additional flexible printed circuits that support the radio-frequency operation of antenna 40-3. Connector structures 80 may sometimes be referred to herein as connector module 80, docking structures 80, or simply as connector 80.

Vent structures 84 may be aligned with one or more openings (holes) 86 in segment 70 of peripheral conductive housing structures 12W. Opening 88 may be interposed on segment 70 between openings 86 and openings 90 (e.g., connector structures 80 may be interposed between vent structures 84 and speaker 82). Vent structures 84 may include a microphone that receives sound (e.g., acoustic waves) through one or more of openings 86. Vent structures 84 may also include a barometric vent for device 10, in which one or more of openings 86 allows air to pass into and/or out of device 10 to equalize the internal air pressure of device 10 to the external air pressure around device 10 (e.g., to help optimize the mechanical integrity of device 10 under different air pressure conditions). Vent structures 84 may sometimes be referred to herein as vent module 84, microphone 84, microphone box 84, microphone module 84, barometric vent 84, barometric vent module 84, or simply as vent 84.

If care is not taken, the presence of speaker 82, connector structures 80, and vent structures 84 may make it difficult to couple the desired radio-frequency components used to feed antenna 40-3. The presence of conductive structures in speaker 82, connector structures 80, and vent structures 84 may also deteriorate the radio-frequency performance of antenna 40-3 (e.g., because the conductive structures are located within the radiating volume of antenna 40-3).

Figure 6:
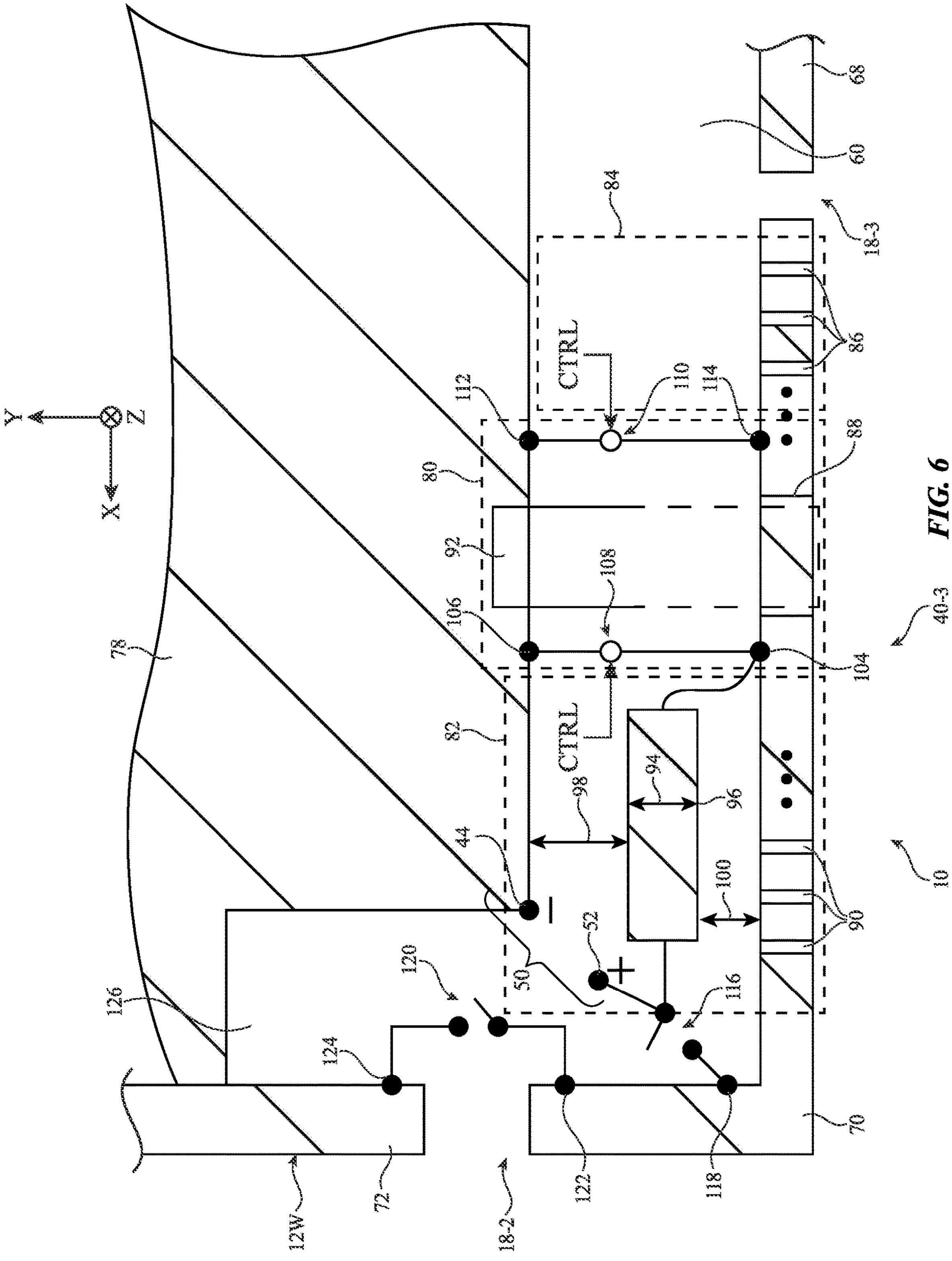
FIG. 6 is an interior top view of an illustrative antenna overlapping speaker structures, connector structures, and vent structures in accordance with some embodiments.

FIG. 6 is a bottom interior view of antenna 40-3 showing how antenna 40-3 may be co-located with speaker 82, connector structures 80, and vent structures 84 while optimizing antenna performance. Rear housing wall 12R (FIG. 4) and other components in device 10 have been omitted from the view shown in FIG. 6 for the sake of clarity. As shown in FIG. 6, antenna 40-3 may have an antenna resonating element arm (e.g., antenna resonating element 45 of FIG. 3) formed from segment 70 of peripheral conductive housing structures 12W.

Antenna 40-3 may be fed using an antenna feed 50 coupled across slot 60. Antenna feed 50 may have a positive antenna feed terminal 52 coupled to segment 70 and may have a ground antenna feed terminal 44 coupled to ground structures 78. Positive antenna feed terminal 52 may be switchably coupled to point (terminal) 118 on segment 70 by a switching circuit such as switch 116.

Antenna 40-3 may have a first return path formed from a tuner 108 coupled between point (terminal) 106 on ground structures 78 and point (terminal) 104 on segment 70. Antenna 40-3 may have a second return path formed from a tuner 110 coupled between point (terminal) 112 on ground structures 78 and point (terminal) 114 on segment 70. The first return path and the second return path may be coupled in parallel between ground structures 78 and segment 70. Point 114 may be interposed on segment 70 between point 104 and gap 18-3. Point 104 may be interposed on segment 70 between point 118 and point 114.

Connector structures 80 may include a connector 92 (sometimes referred to herein as data connector 92 or dock connector 92). Connector 92 may extend through opening 88 in segment 104. Opening 88 may be interposed on segment 70 between points 104 and 114. In other words, connector 92 may be interposed between the first return path having tuner 108 and the second return path having tuner 110 for antenna 40-3. If desired, vent structures 84 may be interposed between the second return path and gap 18-3. The first return path may be interposed between connector 92 and speaker 82. Connector structures 80 may also include a printed circuit such as a dock flex (not shown in FIG. 6 for the sake of clarity). Connector 92 may be mounted to the dock flex (e.g., using solder).

Slot 60 may include a vertical portion that extends parallel to longitudinal axis 76 of FIG. 5 (Y-axis of FIG. 6) and beyond gap 18-2. As shown in FIG. 6, slot 60 may include an extended (elongated) portion 126. Extended portion 126 of slot 60 may extend between segment 72 and ground structures 78 (e.g., segment 72 and ground structures 78 may define opposing edges of extended portion 126), parallel to the Y-axis. Extended portion 126 of slot 60 may have an open end at gap 18-2 and an opposing closed end formed from ground structures 78. Extended portion 126 of slot 60 may sometimes be referred to herein simply as slot 126. Slot 126 may form a slot antenna resonating element for antenna 40-4 (FIG. 5).

A point (terminal) 122 on segment 70 (e.g., at or adjacent to gap 18-2) may be coupled to a point (terminal) 124 on segment 72 (e.g., at or adjacent to gap 18-2) by a switching circuit such as switch 120. One or more tuning components such as fixed or switchable inductors, capacitors, and/or resistors (not shown) may be coupled between points 122 and 124 in parallel with switch 120 if desired. Point 122 may be interposed on segment 70 between point 118 and gap 18-2. Switch 120 may be opened (e.g., turned off to create an open circuit or infinite impedance between points 122 and 124) or closed (e.g., turned on to create a short circuit or zero impedance between points 122 and 124) to tune the frequency response of antenna 40-3 and/or antenna 40-4 (FIG. 5) (e.g., by selectively extending the radiating volume of antenna 40-3 to include at least some of slot 126).

While positive antenna feed terminal 52 of antenna 40-3 is coupled to a first location on segment 70 (e.g., point 118) via switch 116, positive antenna feed terminal 52 may also be coupled to a second location on segment 70 such as point (terminal) 104 via conductive trace 96 overlapping slot 60. The length of the resonating element arm of antenna 40-3 (segment 70) may be selected so that antenna 40-3 radiates at desired operating frequencies such as frequencies in a cellular low band (e.g., a frequency band between about 600 MHz and 960 MHz), a cellular low-midband (e.g., a frequency band between about 1410 MHz and 1510 MHz), a cellular midband (e.g., a frequency band between about 1710 MHz and 2170 MHz), and/or a cellular ultra-high band (e.g., a frequency band between about 3400 MHz and 3600 MHz).

For example, the length of segment 70 extending from point 118 to gap 18-3 and/or the length of segment 70 extending from point 118 to gap 18-2 may be selected to cover frequencies in the cellular low-midband, the cellular midband, the cellular high band, and/or the cellular ultra-high band (e.g., in a fundamental and/or harmonic mode(s)). In the fundamental mode, these lengths may be approximately equal to one-quarter of the wavelength corresponding to a frequency in the frequency band of interest (e.g., where the wavelength is an effective wavelength that accounts for dielectric loading by the dielectric materials in slot 60). Antenna 40-3 may cover these bands when switch 116 is closed to couple positive antenna feed terminal 52 to point 118, for example. If desired, switch 116 may decouple positive antenna feed terminal 52 from conductive trace 96 when coupling positive antenna feed terminal 52 to point 118.

The length of segment 70 between gaps 18-3 and 18-2 (or some subset thereof) may be selected to cover relatively low frequencies such as frequencies in the cellular low band. For example, this length may be selected to be approximately equal to one-quarter of the effective wavelength corresponding to a frequency in the cellular low band. Feeding antenna 40-3 at point 118 (e.g., by closing switch 116) may limit the length of segment 70 that is available to cover the low band. To optimize performance within the low band, switch 116 may be opened and positive antenna feed terminal 52 may be coupled to point 104 on segment 70 via conductive trace 96. Openings 90 for speaker 82 may be interposed on segment 70 between points 118 and 104. Segment 70 may then be fed via conductive trace 96 at point 104. Point 104 may therefore sometimes be referred to herein as a positive antenna feed terminal when switch 116 is open. Opening switch 116 to couple positive antenna feed terminal 52 to point 104 may serve to shift electromagnetic hotspots in the cellular low band away from gap 18-3 and connector 92 and towards gap 18-2, for example. This may serve to minimize loading in the low band by connector structures 80 and connector 92, as well as by external objects such as the user's body, thereby maximizing antenna efficiency in the low band.

In some scenarios, point 104 may be directly fed using a dedicated transmission line other than the transmission line coupled to antenna feed 50 of antenna 40-3. However, use of a separate transmission line and the corresponding switching circuitry can undesirably attenuate the radio-frequency signals conveyed by the antenna. This attenuation may be eliminated by using the same radio-frequency transmission line to convey signals to both points 118 and 104 via positive antenna feed terminal 52. At the same time, point 104 is located relatively far from the transmission line for antenna 40-3. If care is not taken, the relatively long conductive path length from the transmission line to point 104 may introduce excessive inductance between the transmission line and point 104 when covering the low band.

To minimize the inductance between point 104 and the transmission line coupled to positive antenna feed terminal 52, conductive trace 96 may have a relatively large width 94. In general, larger (wider) widths 94 may reduce the inductance between the transmission line and point 104 more than shorter (narrower) widths 94. At the same time, width 94 may be limited by the amount of space available between ground structures 78 and segment 70 (e.g., the width of slot 60). As examples, width 94 may be between 2.0 mm and 2.3 mm, between 2.5 mm and 2.9 mm, approximately 2.7 mm, between 1 mm and 4 mm, or any other desired width that balances a reduction in inductance with the amount of available space within slot 60. The length of conductive trace 96 (e.g., as measured perpendicular to width 94) may be approximately 20 mm, between 15 mm and 25 mm, between 10 mm and 20 mm, or any other desired length. The ratio of the length of conductive trace 96 to width 94 may be between 3 and 10, between 2 and 10, between 5 and 15, between 6 and 10, between 5 and 9, or any other desired ratio, as examples.

Conductive trace 96 may be located at a distance 100 from segment 70 and at a distance 98 from ground structures 78 (e.g., conductive trace 96 may be separated from ground structures 78 by a first portion of slot 60 and may be separated from segment 70 by a second portion of slot 60). Distance 100 may be shorter than distance 98 if desired. Distance 100 may be selected to allow conductive trace 96 to form a distributed capacitance with segment 70 such that when switch 116 is closed (e.g., when positive antenna feed terminal 52 is shorted to point 118), conductive trace 96 electrically forms a single integral conductor with segment 70. When switch 116 is open (e.g., when positive antenna feed terminal 52 feeds point 104 via conductive trace 96), conductive trace 96 electrically forms an inductor that is coupled in series between positive antenna feed terminal 52 and point 104 and that has an inductance that is lower than in scenarios where a conductive line or wire is used to connect positive antenna feed terminal 52 to point 104. As examples, distance 98 may be approximately 1.0 mm, between 0.8 mm and 1.2 mm, between 0.6 and 1.4 mm, or any other desired distance. Distance 100 may be approximately 0.5 mm, between 0.3 mm and 0.7 mm, between 0.2 mm and 0.8 mm, between 0.6 mm and 0.1 mm, or any other desired distance that is less than distance 98.

When configured in this way, conductive trace 96 may form a relatively low-inductance feed line combiner (sometimes referred to as a feed combiner or trace combiner) that allows points 118 and 104 to share the same positive antenna feed terminal 52 and thus the same signal conductor of the same transmission line without sacrificing antenna efficiency even though points 118 and 104 are located relatively far apart. Conductive trace 96 may sometimes be referred to herein as feed combiner trace 96, low inductance trace 96, low inductance feed combiner trace 96, low inductance feed line combiner trace 96, fat trace 96, thick trace 96, wide trace 96, low inductance path 96, trace combiner 96, low inductance feed combiner structure 96, or feed line inductance limiting structure 96.

Tuners 108 and 110 may include one or more tuning components (elements) for antenna 40-3. The tuning components may include switches and/or one or more fixed or adjustable resistors, capacitors, and/or inductors. The tuning components may, if desired, be surface-mount technology (SMT) components mounted to an underlying substrate (e.g., flexible printed circuits in connector structures 80). If desired, tuners 108 and 110 may include an encapsulation layer, a dielectric cap, and/or an electromagnetic shield that covers the tuning components.

The tuning components may help to tune the frequency response of antenna 40-3 in one or more bands (e.g., the low band). Tuners 108 and 110 may receive control signals CTRL. Control signals CTRL may dynamically change (adjust) the state of one or more switches (e.g., switching circuitry) in tuners 108 and 110, may adjust the capacitance of one or more adjustable capacitors in tuners 108 and 110, may adjust the inductance of one or more adjustable inductors in tuners 108 and 110, and/or may adjust the resistance of one or more adjustable resistors in tuners 108 and 110 to change the frequency response of antenna 40-3 over time. Control signals CTRL may, for example, include sawtooth waveforms.

The example of FIG. 6 is merely illustrative. If desired, conductive trace 96 may have other shapes (e.g., shapes following straight or meandering paths and having curved and/or straight edges). While switch 116 is shown only as coupling positive antenna feed terminal 52 and conductive trace 96 to point 118 in FIG. 6 for the sake of clarity, switch 116 may also have a state in which switch 116 forms a short circuit path from point 118 to ground structures 78 (e.g., at frequencies in the low band). If desired, when antenna 40-2 (FIG. 5) is actively covering the low band, switch 116, tuner 108, and/or tuner 110 may be controlled to form short circuit paths to ground at frequencies in the low band to effectively kill any low band resonance of antenna 40-3 while antenna 40-2 is covering the low band, minimizing interference between the antennas and the impact of connector 92 on low band communications.

Figure 7:
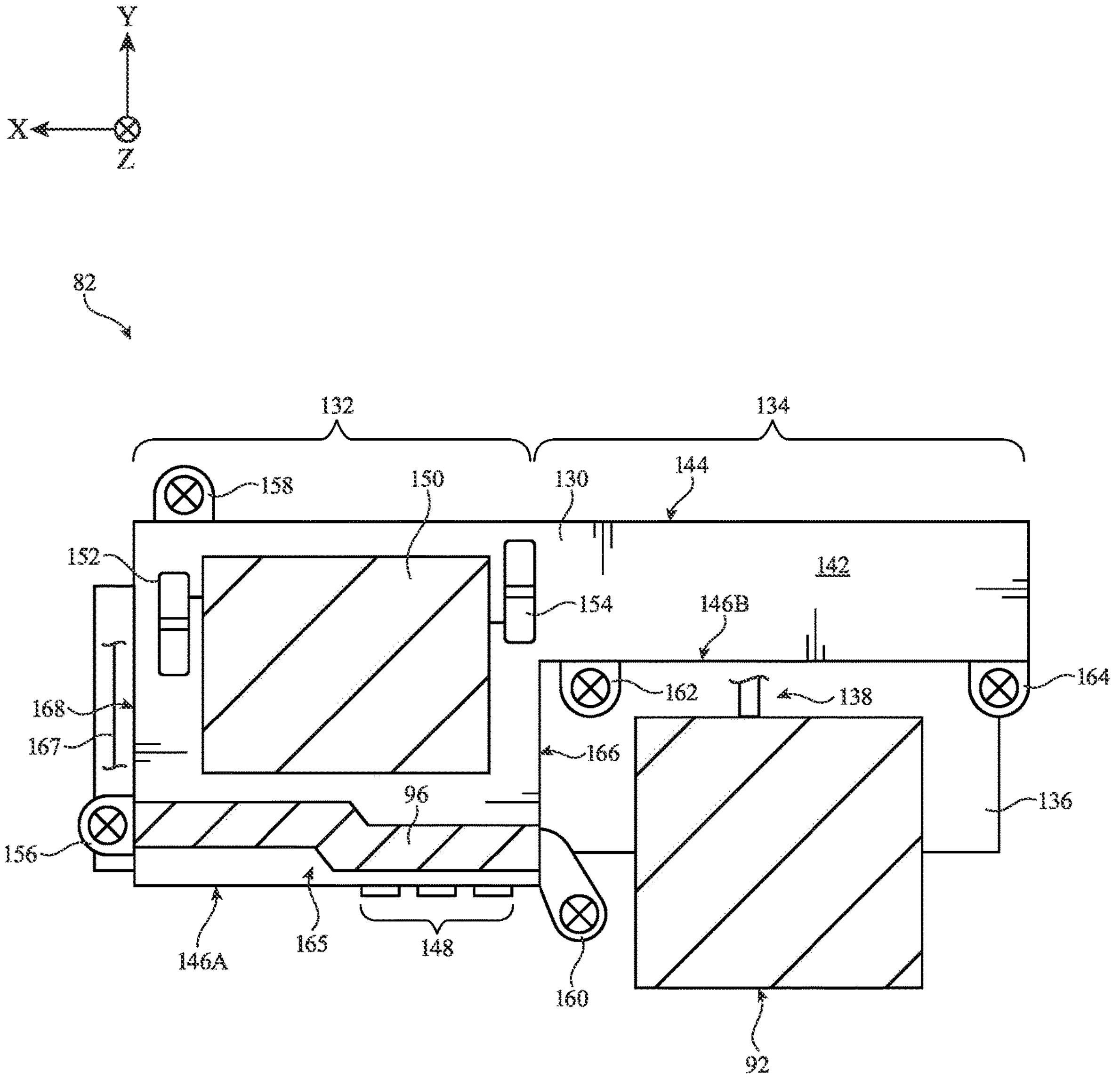
FIG. 7 is a top view showing how illustrative speaker structures may be integrated into an overlapping antenna in accordance with some embodiments.

FIG. 7 is a rear view of speaker 82 showing how speaker 82 may be integrated into antenna 40-3 with minimal impact on antenna performance. As shown in FIG. 7, speaker structures 82 may include a speaker substrate such as substrate 130 (sometimes referred to herein as speaker box 130). Substrate 130 may include, for example, injection molded plastic. Substrate 130 may include an interior cavity or volume, sometimes referred to herein as a speaker cavity, a speaker chamber, an acoustic cavity, or an acoustic chamber (not shown). Substrate 130 may include one or more openings 148 that are acoustically coupled to the cavity (sometimes referred to herein as speaker port 148). Openings 148 may be aligned with openings 90 in segment 70 of peripheral conductive housing structures 12W (FIG. 6).

Speaker 82 may have a speaker driver mounted within the cavity. The speaker driver may receive electrical audio signals that cause the speaker driver to produce acoustic sound waves within the cavity (e.g., the speaker driver may convert electrical audio signals into acoustic sound waves).

The cavity may serve to amplify and/or adjust a frequency response of the acoustic sound waves. The acoustic sound waves may then pass through openings 148 in substrate 130 and openings 90 in peripheral conductive housing structures 12W (FIG. 6) to be heard by a user.

Conductive structures for speaker 82 may be embedded within substrate 130. The conductive structures may include ground traces (e.g., conductive traces patterned onto substrate 130 and held at a ground potential to form part of the antenna ground for antenna 40-3 of FIG. 6). The conductive structures may also include a conductive speaker plate such as speaker plate 150. Speaker plate 150 may, for example, be formed from sheet metal or another metal member embedded within or disposed on substrate 130 (e.g., at, on, or under lateral surface 142). Speaker plate 150 may have a lateral surface area extending parallel to lateral surface 142 of substrate 130. Speaker plate 150 may define one or more sides of the cavity within substrate 130. Speaker plate 150 may, for example, serve to form a rigid wall or boundary of the cavity that helps to optimize the audio response of the acoustic sound waves produced by speaker 82. Speaker plate 150 may also help to reinforce the mechanical integrity of speaker 82.

As shown in FIG. 7, substrate 130 may include a first portion such as main body portion 132 and a second portion such as tail portion 134. Main body portion 132 may be thicker than tail portion 134 (e.g., as measured parallel to the Y-axis) to help accommodate the presence of connector 92 adjacent tail portion 134. Speaker plate 150 may, for example, overlap at least main body portion 132. Substrate 130 may have a first lateral surface 142 (e.g., facing rear housing wall 12R of FIG. 4). Substrate 130 may have an opposing second lateral surface facing the display for device 10. Substrate 130 may also have sidewalls (edges) such as a first sidewall 144 and a second sidewall 146 opposite first sidewall 144. Sidewall 146 may include a first portion 146A on main body portion 132 and a second portion 146B on tail portion 134 of substrate 130. Substrate 130 may have a sidewall 168 that extends from sidewall 144 to sidewall 146. Substrate 130 may also have a sidewall 166 opposite sidewall 168. Sidewall 166 may extend from first portion 146A of sidewall 146 to second portion 146B of sidewall 146. Sidewalls 146, 144, and 168 may extend perpendicular to lateral surface 142 (e.g., in the Z-Y plane or the X-Z plane of FIG. 7). The lateral surfaces and sidewalls of substrate 130 may sometimes be referred to herein simply as walls of speaker 82 or substrate 130.

To prevent speaker plate 150 from deteriorating the antenna performance for antenna 40-3 (FIG. 6), speaker plate 150 may be held at a ground potential (e.g., to form part of the antenna ground for antenna 40-3 of FIG. 6). Speaker 82 may include conductive interconnect structures such as a conductive interconnect structures 152 and 154 mounted to lateral surface 142 of substrate 130. Speaker plate 150 may, if desired, be laterally interposed between conductive interconnect structures 152 and 154. Conductive interconnect structures 152 and 154 may be electrically coupled to speaker plate 150 and the ground traces within substrate 130.

When speaker 82 is mounted within device 10, conductive interconnect structures 152 and 154 may couple the ground traces and speaker plate 150 to ground structures 78 of FIG. 6. Conductive interconnect structures 152 and 154 may, for example, couple speaker plate 150 and the ground traces to conductive support plate 58 of FIG. 4 (e.g., conductive interconnect structures 152 and 154 may press against conductive support plate 58). In one implementation that is described herein as an example, conductive interconnect structures 152 and 154 include conductive springs. In this way, the ground structures in speaker 82 (e.g., ground traces in substrate 130 and speaker plate 150) may be held at a consistent ground potential to form integral parts of the antenna ground for antenna 40-3 (FIG. 6), thereby optimizing antenna performance.

As shown in FIG. 7, speaker 82 may be mounted to an overlying printed circuit such as dock flex 136 (e.g., a flexible printed circuit in connector structures 80 of FIG. 6). Connector 92 may be mounted to dock flex 136 (e.g., using solder). Dock flex 136 may include one or more conductive paths 138 (e.g., power lines/paths, control lines/paths, signal lines/paths, data lines/paths, ground lines/paths, etc.) coupled to connector 92. Conductive paths 138 may include conductive traces and/or conductive vias on dock flex 136, for example.

Dock flex 136 may also include one or more radio-frequency conductive paths such as radio-frequency conductive path 167. Radio-frequency conductive path 167 may form part of the radio-frequency transmission line path 42 (FIG. 3) for antenna 40-3 (FIG. 6). Radio-frequency conductive path 167 may, for example, include conductive traces and/or conductive vias that form part of the signal conductor (e.g., signal traces) and/or ground conductor (e.g., ground traces) for antenna 40-3 (FIG. 6). Radio-frequency conductive path 167 may be coupled to antenna 40-3 at positive antenna feed terminal 52 and ground antenna feed terminal 44 (FIG. 6). Radio-frequency conductive path 167 may also be coupled to conductive structures on speaker 82.

For example, as shown in FIG. 7, conductive trace 96 may be disposed or patterned onto lateral surface 142 of the main body portion 132 of substrate 130 in speaker 82. While conductive trace 96 and speaker plate 150 are shown as being exposed in FIG. 7, conductive trace 96 and/or speaker plate 150 may be embedded within substrate 130 or may be covered with one or more dielectric layers (e.g., an encapsulation layer, a protective cap, an integral portion of substrate 130, etc.). Conductive trace 96 may extend from sidewall 168 to sidewall 166 of main body portion 132 of substrate 130. Conductive trace 96 may have a first end (at sidewall 168) and an opposing second end (at sidewall 166). Conductive trace 96 may, if desired, have one or more bends such as bend 165 that help conductive trace 96 to exhibit a desired length despite the constrained width of main body portion 132 of substrate 130 (e.g., as measured parallel to the X-axis).

The second end of conductive trace 96 may be coupled to conductive interconnect structure 160. Conductive interconnect structure 160 may mount sidewall 166 of speaker 82 to segment 70 of peripheral conductive housing structures 12W (e.g., at point 104 of FIG. 6). Conductive interconnect structure 160 may also electrically couple the second end of conductive trace 96 to point 104 on segment 70 of FIG. 6. The first end of conductive trace 96 may be coupled to radio-frequency conductive path 167 on the overlying dock flex 136 by a conductive interconnect structure extending through substrate 130 parallel to the Z-axis (not shown in FIG. 7 for the sake of clarity). Switch 116 of FIG. 6 may, if desired, be disposed on dock flex 136. The point where radio-frequency conductive path 167 on dock flex 136 meets the conductive interconnect structure coupled to the first end of conductive trace 96 and/or the switch 116 on dock flex 136 may, for example, form positive antenna feed terminal 52 of FIG. 6.

Speaker 82 may include a conductive interconnect structure 156 that mounts sidewall 168 of speaker 82 to segment

70 of peripheral conductive housing structures 12W (e.g., at point 118 of FIG. 6). Conductive interconnect structure 156 may also electrically couple the first end of conductive trace 96 on substrate 130 and radio-frequency conductive path 167 on dock flex 136 to point 118 of segment 70 of FIG. 6 (e.g., via switch 116 of FIG. 6, which may be on dock flex 136 of FIG. 7).

If desired, speaker 82 may include additional conductive interconnect structures. For example, speaker 82 may include a conductive interconnect structure 158 at sidewall 144 (e.g., on main body portion 132 of substrate 130, where sidewall 144 meets sidewall 168). Conductive interconnect structure 158 may help to mount substrate 130 within device 10 (e.g., to a portion of ground structures 78 of FIG. 6). Conductive interconnect structure 158 may, if desired, be coupled to ground traces or other ground structures in substrate 130.

Speaker 82 may also include a conductive interconnect structure 162 at second portion 146B of sidewall 146 (e.g., where second portion 146B of sidewall 146 meets sidewall 166) and a conductive interconnect structure 164 at second portion 146B of sidewall 146. In one implementation that is described herein as an example, conductive interconnect structures 156, 160, 162, 164, and 158 each include respective conductive bracket(s) and a respective conductive screw extending through an opening in the conductive bracket(s) (e.g., for mechanically fastening and electrically coupling the conductive bracket(s) together and/or to other conductive structures such as threaded screw bosses).

Conductive interconnect structures 162 and 164 may help to mount speaker 82 within device 10. Conductive interconnect structures 162 and 164 may also help to mount one or more flexible printed circuits in connector structures 80 (FIG. 6) to speaker 82. If desired, conductive interconnect structure 162 may help to mount speaker 82 and/or a flexible printed circuit in connector structures 80 (FIG. 6) to dock flex 136 and/or to a conductive frame for connector 92. If desired, conductive interconnect structure 162 may help to short ground traces on the flexible printed circuit in connector structures 80 (FIG. 6) to ground traces on dock flex 136 and/or to the conductive frame for connector 92 (e.g., to hold each of these components at the same ground potential). If desired, conductive interconnect structure 164 may be used to couple ground traces in substrate 130 to ground traces in the flexible printed circuits in connector structures 80 (FIG. 6) and ground traces in dock flex 136. If desired conductive interconnect structure 164 may also be used to couple control signals from one or more control lines on dock flex 136 onto control lines in the flexible printed circuits in connector structures 80 (FIG. 6) for use in adjusting tuners 108 and 110 of FIG. 6.

Figure 8:
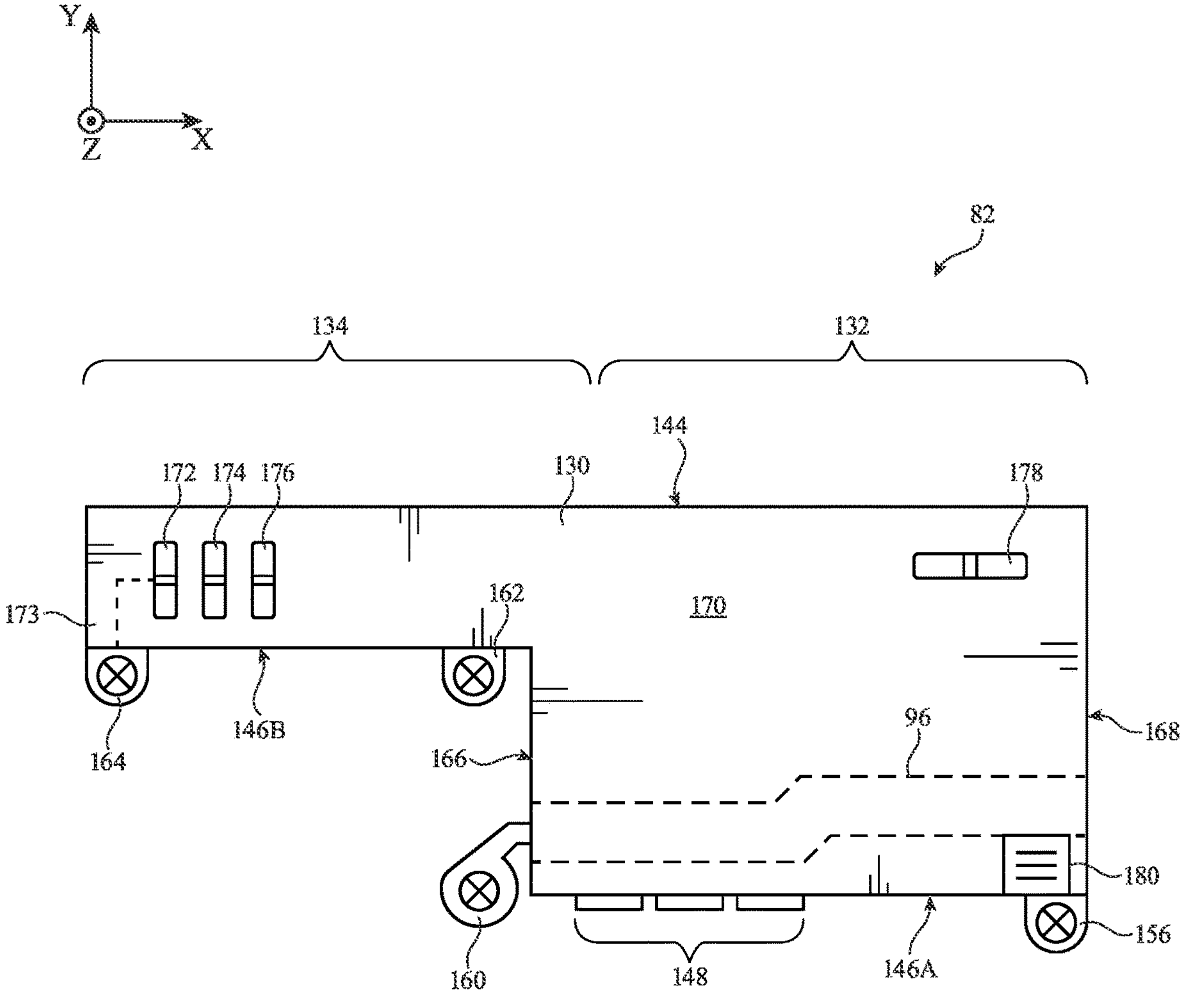
FIG. 8 is a bottom view showing how illustrative speaker structures may be integrated into an overlapping antenna in accordance with some embodiments.

FIG. 8 is a front view of speaker 82. Dock flex 136 and connector 92 of FIG. 7 have been omitted from FIG. 8 for the sake of clarity. As shown in FIG. 8, substrate 130 may have a lateral surface 170 opposite lateral surface 142 (FIG. 7). A conductive interconnect structure 178 may be disposed on lateral surface 170 within main body portion 132 of substrate 130 (e.g., overlapping conductive interconnect structure 152 and/or speaker plate 150 of FIG. 7). Conductive interconnect structure 178 may be electrically coupled to ground traces within substrate 130, conductive interconnect structure 152 (FIG. 7), and/or speaker plate 150 (FIG. 7).

When speaker 82 is mounted within device 10, conductive interconnect structure 178 may couple the ground traces and speaker plate 150 in substrate 130 to ground structures 78 of FIG. 6. Conductive interconnect structure 178 may, for example, couple speaker plate 150 and the ground traces in speaker 82 to ground traces on dock flex 136 of FIG. 7 (e.g., conductive interconnect structure 178 may press against a ground contact pad on dock flex 136). The ground traces on dock flex 136 may also be electrically coupled to display module 62 (FIG. 5). In this way, the ground traces on dock flex 136, conductive interconnect structure 178, the ground traces in substrate 130, speaker plate 150 (FIG. 7), and/or conductive interconnect structure 152 (FIG. 7) may form a conductive interconnect structure 63 (FIG. 5) that couples display module 62 to conductive support plate 58 (through speaker 82) to help vertically distribute the antenna ground for antenna 40-3 (FIG. 6) across within device 10.

As shown in FIG. 8, conductive interconnect structures 172, 174, and 176 may be disposed on lateral surface 170 within tail portion 134 of substrate 130. Conductive interconnect structures 152 and 154 (FIG. 7) and conductive interconnect structures 172, 174, 176, and 178 (FIG. 8) may sometimes also be referred to herein as conductive contacts or conductive pins. In one implementation that is described herein as an example, conductive interconnect structures 172, 174, 176, and 178 each include conductive springs.

Conductive interconnect structures 174 and 176 may be coupled to a speaker driver in speaker 82 (e.g., a speaker driver mounted within an acoustic cavity or chamber within substrate 130). Conductive interconnect structures 174 and 176 may, for example, be power leads or contacts for the speaker driver. When speaker 82 is mounted within device 10, conductive interconnect structures 174 and 176 may couple the speaker driver to conductive traces (e.g., may press against power traces or audio traces) on dock flex 136 (FIG. 7). The conductive traces (e.g., power traces or audio traces) and conductive interconnect structures 174 and 176 may convey power and/or audio signals to the speaker driver for producing acoustic sound.

Conductive interconnect structure 172 may be coupled to conductive interconnect structure 164 (e.g., at the opposing lateral surface 142 of FIG. 7) via conductive structures 173 extending through substrate 130. Conductive structures 173 may include conductive traces, conductive members, conductive springs, conductive pins, wire, conductive vias, and/or any other desired conductive interconnect structures. When speaker 82 is mounted within device 10, conductive structures 173 and conductive interconnect structures 172 may couple conductive interconnect structure 164 to ground traces on dock flex 136 (FIG. 7) and to conductive traces on dock flex 136 that are used to convey control signals CTRL to tuners 108 and 110 of FIG. 6 (sometimes referred to herein as control traces). Radio-frequency signals (antenna currents) may be conveyed between conductive interconnect structure 164 and the ground traces through conductive structures 173 and conductive interconnect structure 172. At the same time, control signals CTRL may be conveyed from the control traces on dock flex 136 (FIG. 7) to conductive interconnect structure 164 through conductive interconnect structure 172 and conductive structures 173.

As shown in FIG. 8, conductive interconnect structure 180 may be disposed on lateral surface 170 within main body portion 134 of substrate 130. Conductive interconnect structure 180 may overlap the first end of conductive trace 96 (e.g., at or near the intersection of sidewall 168 and first portion 146A of sidewall 146). Conductive interconnect structure 180 may be coupled to the first end of conductive trace 96 and to conductive interconnect structure 156. Conductive interconnect structure 180 may, for example, include a conductive member, conductive spring, conductive pin, conductive via, or other conductive structure that extends vertically through substrate 130 (e.g., in the −Z direction) to couple to the first end of conductive trace 96 and to conductive interconnect structure 156 on the opposing lateral surface 142 of substrate 130 (FIG. 7). When speaker 82 is mounted within device 10, conductive interconnect structure 180 may be coupled to (e.g., pressed against) a contact pad coupled to radio-frequency conductive path 167 on dock flex 136 of FIG. 7. This may serve to couple radio-frequency conductive path 167 to both the first end of conductive trace 96 and point 118 of FIG. 6 (e.g., via conductive interconnect structure 156 of FIGS. 7 and 8).

When switch 116 of FIG. 6 (e.g., on dock flex 136 of FIG. 7) is closed, conductive interconnect structure 180 may couple the positive antenna feed terminal 52 (FIG. 6) on radio-frequency conductive path 167 (FIG. 7) to point 118 on segment 70 (FIG. 6) via conductive interconnect structure 156 (FIGS. 7 and 8). When switch 116 of FIG. 6 is open, conductive interconnect structure 180 may couple the positive antenna feed terminal 52 (FIG. 6) on radio-frequency conductive path 167 (FIG. 7) to the first end of conductive trace 96 through substrate 130 (FIGS. 7 and 8). Conductive trace 96 then couples the positive antenna feed terminal to point 104 on segment 70 (FIG. 6) via conductive interconnect structure 160 (FIGS. 7 and 8). In this way, speaker 82 may be integrated into the volume of antenna 40-3 (FIG. 6) without sacrificing acoustic performance and while optimizing the wireless performance of antenna 40-3.

Figure 9:
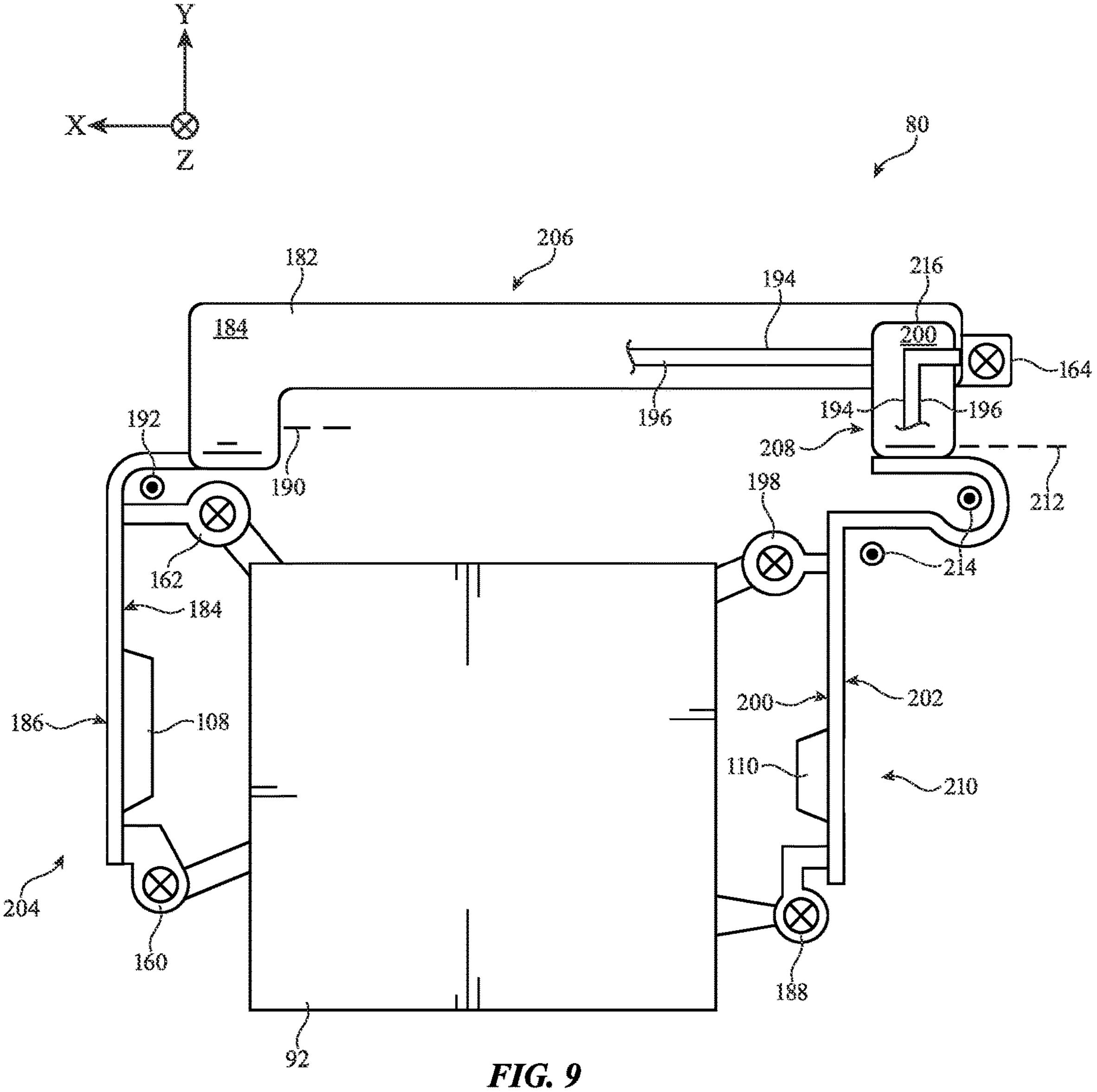
FIG. 9 is a top view showing how illustrative connector structures may be integrated into an overlapping antenna in accordance with some embodiments.

FIG. 9 is a rear view of connector structures 80 showing how connector structures 80 may be integrated into antenna 40-3 (FIG. 6) with minimal impact on antenna performance. Speaker 82 (FIGS. 5-8), vent structures 84 (FIGS. 5 and 6), and dock flex 136 (FIG. 7) have been omitted from FIG. 9 for the sake of clarity.

As shown in FIG. 9, connector structures 80 may include a flexible printed circuit structure. The flexible printed circuit structure may include at least a first flexible printed circuit 182 (sometimes referred to herein as flex 182) and a second flexible printed circuit 216 (sometimes referred to herein as flex 216). Flex 182 may have a first lateral surface 184 and an opposing second lateral surface 186. Flex 216 may have a first lateral surface 200 and an opposing second lateral surface 202. Flex 182 may have a first portion 206 (sometimes referred to herein as end 206 or tail 206) and a second portion 204 (sometimes referred to herein as end 204 or tail 204) extending from first portion 206. Flex 182 may have a first portion 208 (sometimes referred to herein as end 208 or tail 208) and a second portion 210 (sometimes referred to herein as end 210 or tail 210) extending from first portion 208.

Flex 182 may be folded about one or more axes. For example, first portion 206 of flex 182 may be folded downwards about axis 190. Second portion 208 of flex 182 may also be folded around one or more axes such as axis 192. Axis 192 may be non-parallel with (e.g., orthogonal to) axis 190. Similarly, flex 216 may be folded about one or more axes. For example, first portion 208 of flex 216 may be folded downwards about axis 212 (e.g., an axis parallel to axis 190). Second portion 210 of flex 216 may be folded about one or more parallel axes 214 (e.g., axes parallel to axis 192 and non-perpendicular or orthogonal to axis 212).

The folds in flexes 182 and 216 may accommodate the presence of connector 92 in connector structures 80 while also serving to mount connector structures 80 within device 10. As shown in FIG. 9, portion 204 of flex 182 may extend (run) along a first (left) edge of connector 92. Lateral surface 184 on portion 204 of flex 182 may face connector 92. Lateral surface 186 on portion 204 of flex 182 may extend along and may be mounted to sidewall 166 of speaker 82 (FIG. 7). If desired, a layer of adhesive may be used to help secure lateral surface 186 on portion 204 of flex 182 to sidewall 166 of speaker 82 (e.g., portion 204 of flex 182 may be interposed between connector 92 and substrate 130 of FIG. 7).

Portion 206 of flex 182 may extend along tail portion 134 of speaker 82 (FIG. 7). Lateral surface 186 on portion 206 of flex 182 may be mounted to lateral surface 142 on tail portion 134 of substrate 130 in speaker 82 (FIG. 7). If desired, a layer of adhesive may be used to help secure lateral surface 186 on portion 206 of flex 182 to lateral surface 142 of speaker 82. The fold in flex 182 about axis 190 may allow flex 182 to extend from lateral surface 142 (FIG. 7) downward onto second portion 146B of sidewall 146 of substrate 130. The fold in flex 182 about axis 192 may allow flex 182 to extend from second portion 146B of sidewall 146 onto sidewall 166 of substrate 130 (FIG. 7).

Lateral surface 200 on portion 208 of flex 216 may be surface-mounted to lateral surface 184 on portion 206 of flex 182 (e.g., using solder and contact pads). The fold in printed circuit 216 about axis 212 may allow flex 216 to extend from lateral surface 142 of substrate 130 downward onto second portion 146B of sidewall 146 of substrate 130 (FIG. 7). The folds in flex 216 about axes 214 may serve to position portion 210 of flex 216 to be interposed between connector 92 and vent structures 84 (FIG. 6).

As shown in FIG. 9, portion 210 of flex 216 may extend (run) along a second (right) edge of connector 92. Lateral surface 200 on portion 210 of flex 216 may face connector 92. Lateral surface 202 on portion 210 of flex 216 may extend along and may be mounted to a sidewall of vent structures 84 (FIG. 6). If desired, a layer of adhesive may be used to help attach lateral surface 202 on portion 210 of flex 216 to the sidewall of the vent structures.

Flexes 182 and 216 may each include conductive traces for feeding and/or controlling the response of antenna 40-3 (FIG. 6). For example, flex 182 and flex 216 may each include a respective ground trace 194 and a respective control trace 196. Ground traces 194 and control traces 196 may be coupled to conductive interconnect structure 164. Conductive interconnect structure 164 may mechanically attach flex 182 and flex 216 to speaker 82 (FIG. 7). Conductive interconnect structure 164 may couple control traces 196 and ground traces 194 to conductive interconnect structure 172 on lateral surface 170 of speaker 82 via conductive structures 173 (FIG. 8). Conductive interconnect structure 172 may couple ground traces 194 to ground traces on dock flex 136 (FIG. 7) and may couple control traces 196 to control traces on dock flex 136.

The ground trace 194 on flex 182 may extend from conductive interconnect structure 164, through portion 206, downward onto portion 204, through portion 204, and to conductive interconnect structure 160 (e.g., the ground trace 194 on flex 182 may be coupled between conductive interconnect structure 164 and conductive interconnect structure 160). Tuner 108 may be surface-mounted to lateral surface 184 on portion 204 of flex 182. Tuner 108 may be disposed on the ground trace 194 on portion 204 of flex 182. The control trace 196 on flex 182 may extend from conductive interconnect structure 164, through portion 206, downward onto portion 204, through portion 204, and to a control input or control terminal on tuner 108 (e.g., the control trace 196 on flex 182 may be coupled between conductive interconnect structure 164 and tuner 108).

The ground trace 194 on flex 216 may extend from conductive interconnect structure 164, through portion 208, downward onto portion 210, through portion 210, and to conductive interconnect structure 188 (e.g., the ground trace 194 on flex 216 may be coupled between conductive interconnect structure 164 and conductive interconnect structure 188). Tuner 110 may be surface-mounted to lateral surface 200 on portion 210 of flex 216. Tuner 110 may be disposed on the ground trace 194 on portion 210 of flex 216. The control trace 196 on flex 216 may extend from conductive interconnect structure 164, through portion 208, downward onto portion 210, through portion 210, and to a control input or control terminal on tuner 110 (e.g., the control trace 196 on flex 216 may be coupled between conductive interconnect structure 164 and tuner 110).

Conductive interconnect structure 160 may mount flex 182 to point 104 on segment 70 of peripheral conductive housing structures 12W (FIG. 6). Connector 92 may also be coupled to conductive interconnect structure 160 (e.g., conductive interconnect structure 160 may help to attach connector 92 to segment 70). Conductive interconnect structure 188 may mount flex 216 to point 114 on segment 70 of peripheral conductive housing structures 12W (FIG. 6). The ground traces 194 on flexes 182 and 216 may be coupled to ground structures 78 (FIG. 6) through conductive interconnect structure 164, conductive structures 173 (FIG. 8), and conductive interconnect structure 172 (FIG. 8).

At the same time, conductive interconnect structure 160 may couple the ground trace 194 on flex 182 to point 104 on segment 70 of peripheral conductive housing structures 12W (FIG. 6). In this way, the ground trace 194 and tuner 108 on flex 182 may form a return path from point 104 to ground structures 78 across slot 60 for antenna 40-3 (FIG. 6). Similarly, conductive interconnect structure 188 may couple the ground trace 194 on flex 216 to point 114 on segment 70 of peripheral conductive housing structures 12W (FIG. 6). In this way, the ground trace 194 and tuner 110 on flex 216 may form a return path from point 114 to ground structures 78 across slot 60 for antenna 40-3 (FIG. 6).

Conductive interconnect structure 164 may receive control signals CTRL (FIG. 6) from control traces on dock flex 136 (FIG. 7) via conductive interconnect structure 172 and conductive structures 173 on speaker 82 (FIG. 8). Conductive interconnect structure 164 may pass control signals CTRL onto the control traces 196 on flexes 182 and 216. Control traces 196 may convey control signals CTRL to tuners 108 and 110. Control signals CTRL may adjust the state of tuners 108 and/or 110 as needed over time to adjust the frequency response of antenna 40-3 (FIG. 6).

As shown in FIG. 9, portion 204 of flex 182 may be coupled to conductive interconnect structures 162 and 160. In addition to coupling flex 182 to peripheral conductive housing structures 12W (FIG. 6), conductive interconnect structure 160 may also help to attach flex 182 to speaker 82 (FIG. 7). Conductive interconnect structure 162 may help to attach flex 182 to speaker 82 (FIG. 7). Conductive interconnect structure 162 may also attach speaker 82 and flex 182 to dock flex 136 (FIG. 7). If desired, conductive interconnect structure 162 may couple the ground trace 194 on flex 182 and/or ground traces on speaker 82 to ground traces or other grounded structures on dock flex 136.

Conductive interconnect structures 198 and 188 may be coupled to portion 210 of flex 216. Conductive interconnect structure 198 may help to attach flex 216 to dock flex 136 (FIG. 7). If desired, conductive interconnect structure 198 may couple the ground trace 194 on flex 182 to ground traces or other grounded structures on dock flex 136. Connector 92 may have a connector frame, shield, or housing (e.g., formed from bent sheet metal). The frame of connector 92 may be held at a ground potential to minimize its impact on the wireless performance of antenna 40-3 (FIG. 6). For example, the frame of connector 92 may be coupled to ground traces on dock flex 136 (FIG. 7). If desired, the frame of connector 92 may be further secured to the dock flex and/or shorted to the ground traces on the dock flex by conductive interconnect structures 162 and 198. The frame of connector 92 may also be attached to point 114 on segment 70 of peripheral conductive housing structures 12W (FIG. 6) by conductive interconnect structure 188.

In one implementation that is described herein as an example, conductive interconnect structures 198 and 188 each include respective conductive bracket(s) and a respective conductive screw extending through an opening in the conductive bracket(s) (e.g., for mechanically fastening and electrically coupling the conductive bracket(s) to each other and/or other conductive structures such as threaded screw bosses). In general, conductive interconnect structures 198 and 188 of FIG. 9, conductive interconnect structures 158, 156, 160, 162, and 164 of FIG. 7, and/or conductive interconnect structures 172, 174, 176, 178, and 173 of FIG. 8 may each include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components, and/or any other desired conductive interconnect structures.

Figure 10:
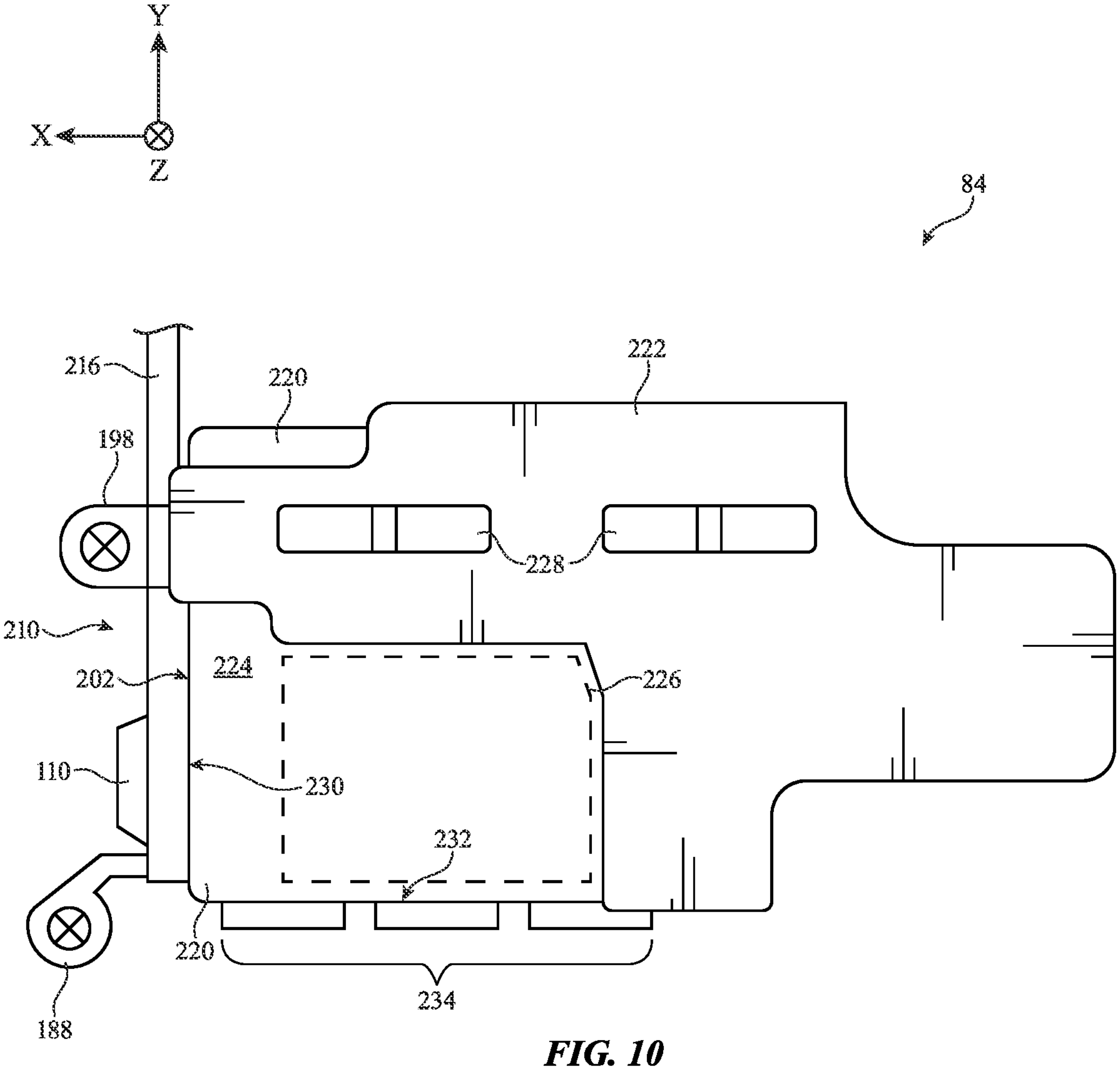
FIG. 10 is a top view showing how illustrative vent structures may be integrated into an overlapping antenna in accordance with some embodiments.

FIG. 10 is a rear view of vent structures 84 showing how vent structures 84 may be integrated into antenna 40-3 (FIG. 6) with minimal impact on antenna performance. Speaker 82 (FIGS. 5-8) and most of dock structures 80 (FIG. 9) have been omitted from FIG. 10 for the sake of clarity.

As shown in FIG. 10, vent structures 84 may include a dielectric substrate such as substrate 220. Substrate 220 may include injection-molded plastic, for example. Substrate 220 may include one or more interior volumes or cavities (chambers). Substrate 220 may include one or more openings 234 that are acoustically coupled to the one or more cavities (sometimes referred to herein as vent port 234). Openings 234 may be aligned with openings 86 in segment 70 of peripheral conductive housing structures 12W (FIG. 6).

Vent structures 84 may include a microphone or other audio sensor mounted within and/or coupled to one of the cavities in substrate 220. The microphone may generate audio signals from sound waves that pass through openings 86 in peripheral conductive housing structures 12W (FIG. 6) and openings 234 in substrate 220. Vent structures 84 may additionally or alternatively include a barometric vent for device 10. For example, one or more of the cavities within substrate 220 and/or one or more openings 234 may allow air to pass between the interior cavity of device 10 and the exterior of device 10. This may, for example, allow the air pressure within device 10 to equalize with the atmospheric pressure around device 10, thereby maximizing the mechanical integrity of device 10. One or more moisture seals may be provided on, in, or near vent structures 84 to prevent water or moisture from entering the interior cavity of device 10 when device 10 is submerged in water (e.g., while also allowing air to pass for the microphone and/or barometric vent).

As shown in FIG. 10, substrate 220 may have a lateral surface 224. Lateral surface 224 may lie in a plane parallel to lateral surface 184 on portion 206 of flex 182 (FIG. 9) and lateral surface 142 of speaker 82 (FIG. 7). Substrate 220 may have at least a first sidewall 232 (facing segment 70 of FIG. 6) and a second sidewall 230 that extends orthogonally from first sidewall 232 (e.g., sidewall 230 may extend parallel to the Y-Z plane whereas sidewall 232 extends parallel to the X-Z plane). Openings 234 may be formed in sidewall 232.

Lateral surface 202 of portion 210 of flex 216 may be extend along and be mounted to sidewall 230 of substrate 220. If desired, a layer of adhesive (not shown) may help to attach flex 216 to sidewall 230. Vent structures 84 may include a conductive cowling such as vent cowling 222. Vent cowling 222 may sometimes also be referred to herein as a frame, housing, enclosure, or shield for substrate 220 and/or vent structures 84. Vent cowling 222 may be, for example, a conductive member formed from a layer of sheet metal. Vent cowling 222 may be attached, adhered, molded to, or otherwise disposed on lateral surface 224 of substrate 220. Vent cowling 222 may also have portions, tabs, or ends that are folded downwards around one or more sidewalls of substrate 220.

Vent cowling 222 may be coupled to conductive interconnect structure 198. Conductive interconnect structure 198 may help to attach vent cowling 222 and vent structures 84 to printed circuit 216, connector 92 (FIG. 9), dock flex 136 (FIG. 7), and the housing for device 10. Conductive interconnect structure 198 may also couple vent cowling 222 to ground traces on dock flex 137 (FIG. 7). This may hold vent cowling 222 at a ground potential, thereby minimizing the impact of vent cowling 222 on the wireless performance of antenna 40-3 (FIG. 6). To further minimize the impact of vent cowling 222 on the wireless performance of antenna 40-3, conductive interconnect structures such as first and second conductive interconnect structures 228 may be disposed on vent cowling 222. When mounted within device 10, conductive interconnect structures 228 may couple (e.g., press against) ground structures 78 of FIG. 6 (e.g., conductive support plate 58 of FIG. 4).

As shown in FIG. 10, tuner 110 for antenna 40-3 may be disposed on portion 210 of flex 216 along sidewall 230 of vent structure 84 (e.g., one of the return paths for the antenna may run along the side of vent structure 84). Radio-frequency antenna current on the ground trace 194 and in tuner 110 on flex 216 are heavily influenced by the presence of nearby conductive material, which may alter impedance, load, or otherwise affect propagation of the current at radio frequencies. For example, if vent cowling 222 were to extend along the entirety of lateral surface 224 along sidewall 230 to sidewall 232, the metal in vent cowling 222 may effectively form a capacitive shunt path to ground for radio-frequency current on flex 216 and in tuner 110, thereby detuning antenna 40-3 (FIG. 6).

To mitigate these issues, vent cowling 222 may include a cut-out region 226 at lateral surface 224 of substrate 220 (e.g., at, overlapping, or adjacent to the location of tuner 110 on flex 216). Cut-out region 226 (sometimes referred to herein as a notch, slot, or opening in vent cowling 222) may be free from conductive material, thereby exposing lateral surface 224 of the underlying substrate 220. The absence of conductive material in cut-out region 226 may increase the separation between the conductive material in vent cowling 222 and tuner 110, thereby minimizing the effect of vent cowling 222 on the radio-frequency antenna current on flex 216 (and thus on the radio-frequency performance of antenna 40-3). Cut-out region 226 may extend across as much as 10-50% of lateral surface 224 of substrate 220, for example. Cut-out region 226 may have other shapes having any desired number of curved and/or straight edges. Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
peripheral conductive housing structures;
a substrate;
a connector mounted to the substrate and protruding through an opening in a segment of the peripheral conductive housing structures;
a first flexible printed circuit having a first portion and a second portion that is folded with respect to the first portion, the second portion being coupled to a first location on the segment and extending along a first side of the connector; and
a second flexible printed circuit having a third portion mounted to the first portion of the first flexible printed circuit and having a fourth portion that is folded with respect to the third portion, the fourth portion being coupled to a second location on the segment and extending along a second side of the connector opposite the first side of the connector.

2. The electronic device of claim 1, further comprising:
an antenna having an antenna resonating element formed from the segment.

3. The electronic device of claim 2, wherein the first flexible printed circuit has a first conductive trace that couples an antenna ground for the antenna to the first location on the segment and wherein the second flexible printed circuit has a second conductive trace that couples the antenna ground to the second location on the segment.

4. The electronic device of claim 3, further comprising:
a first tuner for the antenna disposed on the first conductive trace.

5. The electronic device of claim 4, further comprising:
a second tuner for the antenna disposed on the second conductive trace.

6. The electronic device of claim 4, further comprising:
a conductive interconnect structure; and
a third conductive trace on the substrate, wherein the first, second, and third conductive traces are coupled to the conductive interconnect structure and the third conductive trace is configured to convey a control signal from the conductive interconnect structure to the first tuner.

7. The electronic device of claim 6, wherein the control signal comprises a sawtooth waveform.

8. The electronic device of claim 2, further comprising:
a vent aligned with openings in the segment and configured to receive sound through the openings, wherein the fourth portion of the second flexible printed circuit is interposed between the vent and the connector.

9. The electronic device of claim 3, further comprising:
a tuner disposed on the first conductive trace and configured to adjust a frequency response of the antenna.

10. The electronic device of claim 9, further comprising:

a control trace on the first flexible printed circuit and coupled to the tuner; and a speaker having a conductive structure configured to convey, to the control trace, a control signal that adjusts a state of the tuner.

11. The electronic device of claim 10, wherein the conductive structure comprises a conductive spring.

12. The electronic device of claim 10, wherein the second portion of the first flexible printed circuit is interposed between the speaker and the connector.

13. The electronic device of claim 9, further comprising:

an additional tuner disposed on the second conductive trace and configured to adjust the frequency response of the antenna.

14. The electronic device of claim 2, wherein the first flexible printed circuit comprises first and second bends between the first portion and the second portion, the first bend being about a first axis and the second bend being about a second axis that is non-parallel to the first axis.

15. The electronic device of claim 14, wherein the second flexible printed circuit comprises third and fourth bends between the third portion and the fourth portion, the third bend being about a third axis and the fourth bend being about a fourth axis that is non-parallel to the third axis.

16. The electronic device of claim 15, wherein the first axis is parallel to the third axis, the second axis is parallel to the fourth axis, and the second axis is orthogonal to the first axis.

17. The electronic device of claim 16, wherein the second flexible printed circuit comprises a fifth bend between the third portion and the fourth portion, the fifth bend being about a fifth axis that is parallel to the fourth axis.

18. The electronic device of claim 15, further comprising:

a first conductive interconnect structure that attaches the second portion of the first flexible printed circuit to the first side the connector;

a second conductive interconnect structure that attaches the second portion of the first flexible printed circuit to the first side of the connector;

a third conductive interconnect structure that attaches the fourth portion of the second flexible printed circuit to the second side of the connector; and a fourth conductive interconnect structure that attaches the fourth portion of the second flexible printed circuit to the second side of the connector.

19. The electronic device of claim 2, wherein the first conductive trace forms part of a first return path to ground for the antenna and the second conductive trace forms part of a second return path to ground for the antenna.

20. The electronic device of claim 1, wherein the connector comprises a universal serial bus connector.

* * * * *